United States Patent

[11] 3,574,300

| [72] | Inventor | Alvin Edward Moore |
| | | 916 Beach Blvd., Waveland, Miss. 39576 |
| [21] | Appl. No. | 803,672 |
| [22] | Filed | Mar. 3, 1969 |
| [45] | Patented | Apr. 13, 1971 |

[54] CRASH-RESISTANT, WATER-TRAVERSING, FLUIDFOIL VEHICLE
15 Claims, 10 Drawing Figs.

| [52] | U.S. Cl. | 114/66.5 |
| [51] | Int. Cl. | B63b 1/20 |
| [50] | Field of Search | 114/66.5 (H) |

[56] References Cited
UNITED STATES PATENTS
3,431,878  3/1969  Moore .......................... 114/66.5

*Primary Examiner*—Andrew H. Farrell

ABSTRACT: A wreck-resistant, lightweight vehicle, adapted to traverse water and optionally to travel also in air or space, comprising: a barrel-curved, preferably rigid-walled cabin; resilient fluid-dynamic foils or wings above and spaced from the cabin; fluid-dynamic foils below and spaced from the cabin (serving in travel thru water as hydrofoils that lift the cabin clear of the water's surface); resilient fluidfoil supports, strongly connecting the ends of each pair of the upper and lower fluidfoils, fitted and bonded to the vertical curves of the cabin sidewalls; and, optionally and preferably, vehicle-stabilizing balloon means, comprising a series of balloon bags in a streamlined skin, fitted between and bonded to the top of the cabin and each upper fluidfoil. The invention includes lightweight, strong, cabin-wall, endless ribs, comprising curved, thin-walled tubes that are strongly inflated with gaseous material and surrounded by integral, strong insulation which comprises substantially rigid foamed plastic, or very lightweight concrete, or similar material. The ribs are epoxy bonded together in a fore-and-aft series, and sheathed in a waterproofed skin.

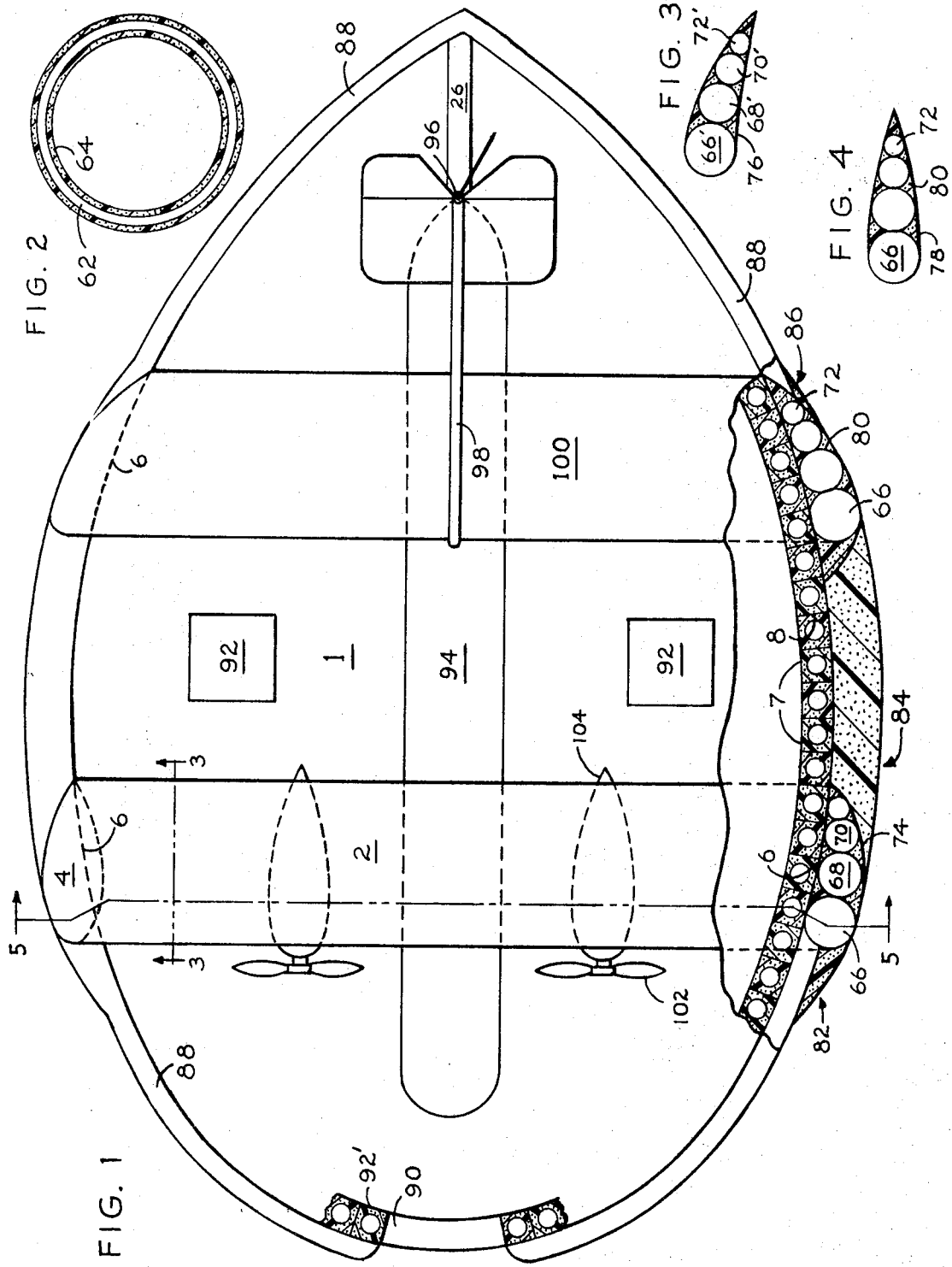

PATENTED APR 13 1971 3,574,300

INVENTOR;
Alvin E. Moore.

CRASH-RESISTANT, WATER-TRAVERSING, FLUIDFOIL VEHICLE

This invention pertains to vehicles that are highly resistant to damage from major shocks in collisions or crashes. It is especially intended for use in hydrofoil boats, but with appropriate engineering calculations concerning lift, size and weight it may be used in the construction of a crash-resistant flying boat, other type of aircraft, or amphibious vehicle. Such a wreck-resistant craft is drastically needed in this time of crowded travel on and adjacent to the earth's surface.

Accordingly, some of the objects of the invention are to provide: (1) a crash-resistant vehicle, for traversing water and/or air, comprising a shock-resistant cabin having curved sidewalls, resilient fluidfoil means below and spaced from the cabin, and resilient supports for the fluidfoil means that are curvingly juxtaposed and joined to curved portions of the cabin sidewalls; (2) such a vehicle in which the cabin has top, bottom and sidewalls that are barrel curved (that is, arcuate in cross sections of the vehicle in a fore-and-aft as well as a transverse direction; (3) a wreck-resistant vehicle, comprising a shock-resistant, substantially rigid cabin having curved sidewalls, resilient fluidfoil means below and spaced from the cabin, and resilient fluidfoil supports that are curvingly juxtaposed and joined to curved portions of the sidewalls; (4) a crash-resistant vehicle, comprising a shock-resistant cabin having curved sidewalls, resilient fluidfoil means below and spaced from the cabin, resilient fluidfoil means above and spaced from the cabin, and resilient fluidfoil supports fixed to ends of the upper and lower fluidfoils and curvingly joined to curved surfaces of the sidewalls; (5) a vehicle having a cabin and upper and lower fluidfoils and supports of the above-described types in which: each combination of a fluidfoil and a support comprises pairs of end-to-end joined, inflated tubes, the forward pairs of these tubes are of larger diameter than rearward pairs, and the fluidfoil tubes are so arranged in fore-and-aft direction as to form the major bulk and strength-provision of resilient, lift-producing, fluid-dynamic foils, and (6) a vehicular cabin comprising a plurality of wall-forming ribs or rings, strongly joined together (preferably by epoxy-resin cement) about the longitudinal axis of the cabin. These and other objectives of the invention are indicated in the attached drawings and the following specification and claims.

In the drawings:

FIG. 1 is a top plan view of the invention, shown as broken away at its bow and on one side to indicate its cabin-wall and fluidfoil-support structure in section along a horizontal plane thru the longitudinal axis of the cabin.

FIG. 2 is a detail view of an optional, annular form of the cabin, in section from a midship plane that is normal to the cabin's longitudinal axis.

FIG. 3 is a detail view of an upper (or a lower) fluidfoil, shown as in section from the vertical plane 3–3 of FIG. 1.

FIG. 4 is a detail view of an alternative arrangement of an upper, balloon-supporting and vehicle-strengthening set of the inflated tubes, shown as in section from the plane 3–3 of FIG. 1.

Figure 7:
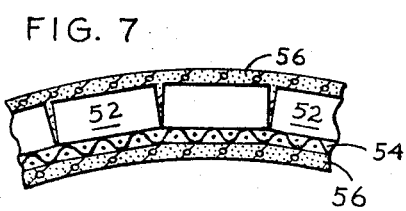

FIG. 7 is a detail view of an alternative type of the cabin walls, comprising an optional form of the buoyant tubular members and their sheaths, in section from a vertical plane that is normal to the longitudinal axis of the cabin. As positioned on the sheet of drawings this view illustrates a section of a top wall, but if turned through 90° it indicates a sidewall, and if turned upside down it illustrates a section of a bottom wall.

Figure 8:
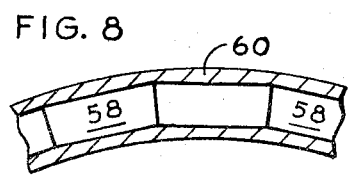

FIG. 8 is a detail view in section, comparable to FIG. 7, showing another type of cabin-wall structure.

Figure 9:
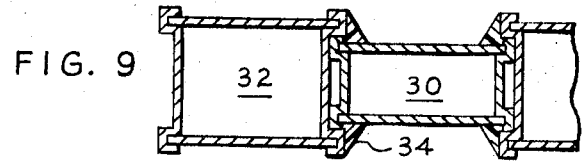

FIG. 9 is a detail view, on a scale larger than that of the other FIGS. showing part of one of the tubular buoyant members of an optional form of interior cabin wall, in section along a plane through the tubular member's axis.

Figure 10:
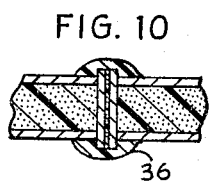

FIG. 10 is a detail view of part of an alternative type of tubular buoyant member of an interior-wall frame, in section from a plane through the longitudinal axis of the member.

Broadly, the invention comprises: a rigid or nearly rigid cabin, 1; resilient fluidfoils or wings, 2; below the cabin, resilient hydrofoils or fluidfoil means, 3; joined to each fluidfoil, a pair of resilient, lateral fluidfoil supports, 4 (which may be streamlined with resilient fairings above and below the cabin); an optional, but preferable, resilient, central fluidfoil-supporting means, 5, fixed to the bottom of the cabin and to a top portion of each lower fluidfoil; and, optionally and preferably between the upper fluidfoil and the cabin, a balloon means, aiding in providing lift on the cabin and stabilization of the vehicle.

Several optional types of cabins, having curved walls of four different shapes, are disclosed. In each of these cabin forms, a cross-sectional vertical plane through each fluidfoil support and the adjacent cabin sidewall intersects the joint between the wall and support in a vertically arcuate curve. This curve, shown between points A and B in FIG. 5, insures that the lifting force of the hydrofoil and/or upper fluidfoil is strongly transferred to the cabin because of the vertically curved contact of the fluidfoil support tubes and cabin wall at the joint; and it also aids in preventing fore-and-aft pivoting of the supports due to the tendency of the fluid-dynamic force on the fluidfoils to pivot or twist them about axes that are transverse to the fore-and-aft direction. Preferably, and as shown in FIG. 1 at 6, the cabin walls and these joints between the walls and the fluidfoil supports are also arcuately curved in intersection with fore-and-aft planes. In the preferred wall shape, shown in FIGS. 1 and 5, the exterior surface of the cabin walls is thus barrel curved—that is, arcuately curved in both fore-and-aft and transverse directions. This barrel type of curvature has the great strength per unit of weight of barrel-shaped containers and is thus a preferred part of the present invention of a very lightweight, very strong, buoyant-walled vehicle.

The joint between points A and B and the similar joints between other fluidfoil supports and wall portions, in each of the disclosed forms of cabins, may comprise bolts or other metallic fastening means; but preferably they consist largely or entirely of liberally applied epoxy cement or putty—material which when set is extremely adhesive and strong. Preferably also the joints between the upper and lower ends of the fluidfoil supports and the ends of the fluidfoils comprise epoxy resin.

In each of the forms of the cabin, and as clearly illustrated in FIG. 1, the curved cabin comprises endless arcuate ribs, 7, that are epoxy bonded together along the junction planes 8 between their juxtaposed flat faces. In the cabin wall of FIG. 5 each endless rib comprises four joined arcuate rib elements, 9, 10, 11 and 12; and each of these elements has a central, elongated, sealed tube, 14, tube-encompassing foamed plastic or similar integral, strong, insulating material, 16, and an outer envelope or skin, 18.

Each of the tubes 14 has a longitudinally curved axis, is preferably round in cross section, and has a thin wall of strong material. This thin material preferably is metal (for example, aluminum alloy, magnalium or steel), but optionally it may comprise textile or metallic fabric that is impregnated with and coated with natural or synthetic rubber or other plastic. For extra strength, with light weight, these tubes 14, as well as the optional other types of wall-frame tubular members shown in FIGS. 7, 8, 9 and 10, preferably are inflated with gaseous material. This gaseous material optionally may be: air, or preferably lighter-than-air, nonaerial gas such as helium, nitrogen, or hydrogen mixed with a small percentage of carbon dioxide or other combustion-inhibiting gas; or, as indicated in FIG. 10, gas-cell-containing foamed plastic that is optionally under above-atmospheric pressure due to placing sufficient amounts of the foam-producing liquids inside the sealed tubes to pressurize the resulting plastic foam. When the tube walls are of flexible fabric and plastic each of them is filled and preferably pressure inflated with such foam plastic, or else it is inflated with gas at a pressure well above that of the atmosphere—for example, at 20 to 40 pounds per square inch. Each gas-strengthened endless rib has at least one gas inlet valve, 20, of the general type of automobile tire valves. When the junctions 22 have small holes in them, each end-joined group of tubes that are thus in flow communication is provided with only one gas-inlet valve; but for extra vehicular safety each tube is preferably sealed at each end and has only one valve. When the tube walls are metallic the gaseous material in them is permanently and hermetically sealed.

The junctions 22 between tube ends comprise end discs that are strongly bonded to the tubes and to each other. Preferably these discs are of the same material as the hollow parts of the tubes. When they comprise fabric and plastic they are bonded to the tubular hollow parts and to each other with epoxy-resin cement or putty; when they are metallic they may be thus bonded, or optionally they may be brazed, welded or soldered to the hollow parts and to each other. The ends of the tubes and of their sheaths of foamed plastic or the like are further strengthened by braces 24 which may comprise metallic angle braces and/or epoxy putty.

Figure 5:
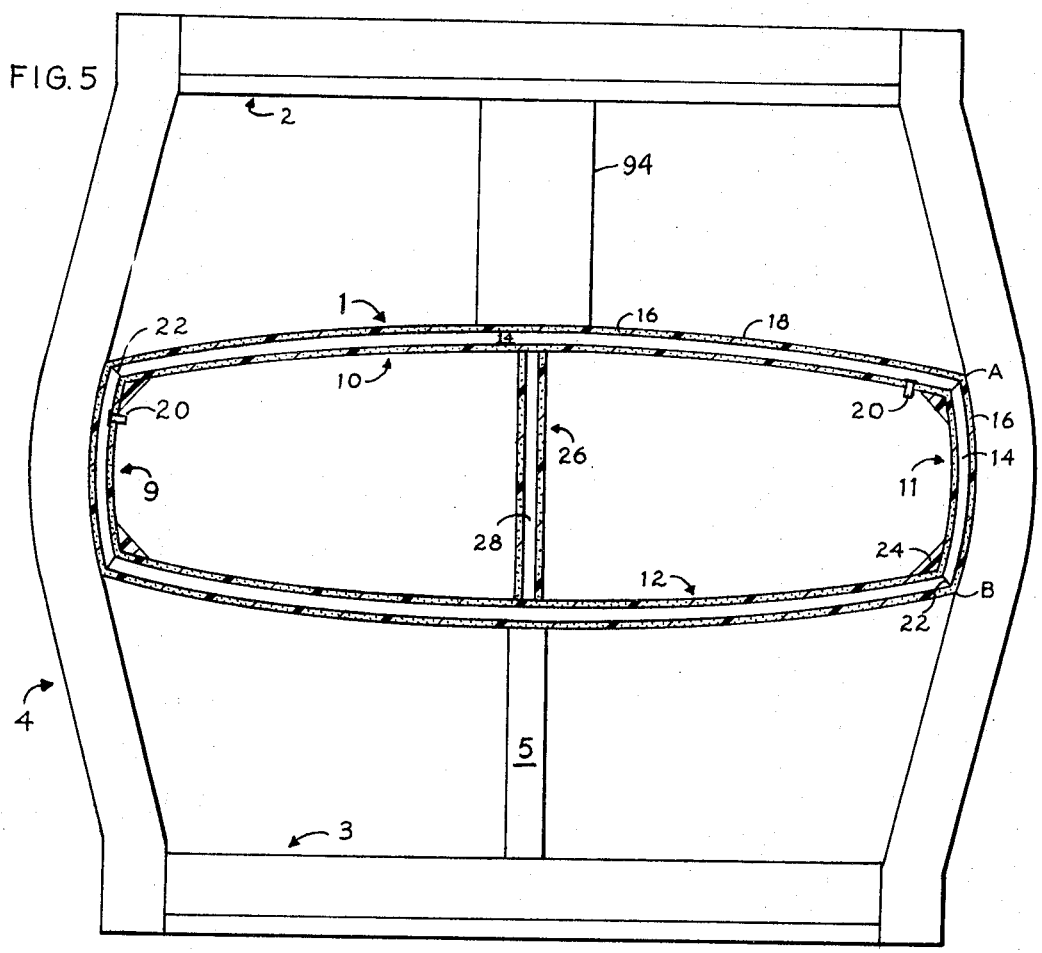
FIG. 5 is a front elevational view of the vehicle, shown as optionally without the wing-supported motors and propellers of FIG. 1, with the cabin being illustrated as in vertical section from the planes 5–5 of FIG. 1.

The skin 18 of the cabin of FIG. 5, as well as a similar outer skin on each of the other disclosed types of cabin walls may be sheet rubber or comprise fabric and plastic. It is bonded to the endless ribs with epoxy or other strong cement. When it comprises fabric and is to be in much contact with water at least its bottom and side portions are of copper mesh (for example, copper screening) which is impregnated with rubber or other plastic but is only thinly coated with the plastic, thus preventing or reducing the adherence of marine life forms to the cabin. Alternatively, at least the bottom and side parts of the skin may be a coating of air-set rubber cement heavily mixed with copper dust or filaments, or sheet material of rubber that is heavily impregnated with such copper particles.

As shown in FIG. 5, the cabin has a width that is large in relation to its height and that aids in achieving much lifting force and substantial lateral stability from the resulting wide fluidfoils. In view of this width, an optional interior partition, 26, is provided for extra cabin strength. This wall, which extends from the stern to a point spaced aft from the central bow window, preferably is of strong buoyant construction, optionally comprising tubes 28 that are similar to 14, except that they are straight, or tubular members comprising rows of sealed, end-joined cans such as are shown in FIG. 9 or FIG. 10. Their axes may be horizontal, but as shown in FIG. 5, they are vertical. In addition to a tube or row of cans, each interior-wall, barlike, rectangular-in-cross-section element, which is preferably square in cross section, comprises molded foamed plastic that surrounds the tube or row of cans, and may comprise a skin, square in cross section, teat envelops the foamed plastic. The tubes or can may be filled with pressurized gas or foamed plastic; and the barlike elements are epoxy glued together to form the wall. In FIG. 9, the illustrated row of end-joined cans comprises a small-diameter can, 30, having end caps that nest within recesses in the end caps of an adjacent pair or larger cans, 32. The can ends are strongly bonded together with epoxy cement or putty, 34, or with brazing, welding or solder.

In FIG. 10, the wall-frame tubular member comprises cans of the same diameter that may be end-joined by brazing, welding or solder; but preferably they are end-joined with epoxy cement or putty, 36; and each such tubular member is encased in foam plastic (optionally sheathed by fabric), thus forming a bar like wall member of the above-described type. Optionally, these cans, filled with gas, may be joined and sheather with the solidified molten metal 60 of FIG. 8.

Figure 6:
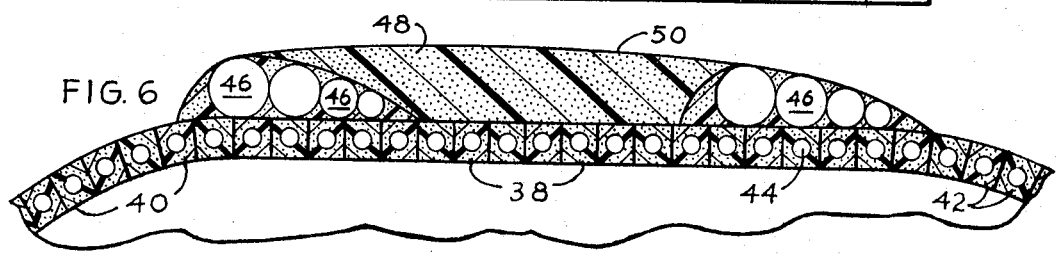
FIG. 6 is a detail view of an optional form of the cabin sidewalls and the curved joints between the sidewalls and the fluidfoil supports, shown as in section along a horizontal plane that contains the longitudinal axis of the cabin.

Sectional FIG. 6 shows a lateral, midship portion of a cabin that is somewhat like that of FIG. 5 but comprises a group of coaxial endless cabin-wall ribs, 38, that are of the same peripheral extent and are epoxy-glued together to form a strength-providing middle part of the cabin wall that is not barrel curved, but instead is cylindrical. The bow and stern portions of the cabin are streamlined and barrel curved as shown in FIG. 1, and comprise endless ribs 40 and 42 that are wedge-shaped in cross section. The set of end-joined tubular members 44, imbedded in foamed plastic or the like, forming the main strength-providing element of each rib, may be like the end-joined tubes 14 or the curved, endless row of end-joined cans that is indicated in either FIG. 7 or FIG. 8.

Because of the cylindrical middle section of the cabin wall of FIG. 6, the tubes 46 of the fluidfoil supports and their enveloping flexible sheath are so arranged relative to the cabin that in their upright portions below and above the cabin sidewalls they present little resistance to the fluid current of vehicular travel, and so have little drag. Their drag is further alleviated by fairings, each of which comprises foamed plastic 48 (preferably stiffly resilient foamed natural or synthetic rubber) and an enveloping, preferably fabric-and-plastic envelope or skin, 50.

The type of cabin structure indicated in FIG. 7 may be barrel curved as in FIG. 1 or cylindrically curved as in FIG. 6. Each cabin rib comprises: an endlessly joined row of sealed cans, 52, that optionally are filled with gas or foamed plastic that may be pressurized; an inner, endless strip, 54, of metallic fabric (for example, expanded aluminum or steel, hardware cloth, small-diameter copper mesh or fence wire); epoxy glue that strongly bonds the strip 54 to each can; and mold-formed plaster, mortar or concrete, 56, which preferably comprises portland cement and lightweight aggregate such as expanded shale or clay, vermiculite, pumice or globules of rigid foamed plastic. Instead of this lightweight, insulating concrete, which coats and impregnates the mesh 54 and strongly fills and braces the wedge-shaped spaces between can ends, molded foamed plastic or cast aluminum may be utilized. And instead of the strip 54, common pipe strap (an apertured band) may be used.

FIG. 8 illustrates a portion of an endless cabin rib that comprises: end-joined cans 58, which contain gas that may be pressurized (or optionally may contain foamed plastic); and cast metal 60 (preferably aluminum, aluminum alloy, magnesium alloy or other lightweight metal) that surrounds and bracingly holds the cans together in a strong cabin rib. Optionally, the rib may be further strengthened by epoxy gluing, brazing or soldering the can ends together before casting the metal on and around them. For the cans 58 cans of the more common type shown at 52 may be utilized. In this event the cast aluminum or other cast metal fills the wedge-shaped spaces between parts of the flanged can ends, thus further strengthening the rib.

The cabin rib that is indicated in FIG. 2 forms part of a barrel-curved or cylindrically curved cabin that is round in cross sections. This rib comprises: an endless, circular, tubular hoop, 62; foamed plastic 64, surrounding the hoop; foamed plastic or gas, either of which may be under above-atmospheric pressure, sealed within the hoop; and, optionally, an outer skin of textile or metallic fabric. The foamed plastic is preferably substantially rigid; and the circular, thin-walled hoop or tube may be a bent and end-joined extruded tube of metal or strong, dense plastic; or it may comprise stamped annular tube halves that are sealingly bonded together with epoxy, brazing, welding or solder. The tube 14 also may be constructed in either of these ways.

The fluidfoils and fluidfoil supports that are preferably used to provide a lift on the cabin comprise joined, resilient, tubes or different diameters that are constructed and fore-and-aft arranged to form strengthening tubular members that are contiguous to fluid-dynamic or streamlined skins. Each fluidfoil support comprises tubes, 66, 68, 70 and 72a; and each fluidfoil comprises 72 that are vertically curved, forming the above-described vertically arcuate joint, in contact with the vertically curved cabin wall; and each fluidfoil comprises tubes 66', 68', 70' and 72' that respectively are of the same diameters as tubes 66, 68, 70 and 72 and end-bonded to the fluidfoil-support tubes.

These tubes, as well as the similar fluidfoil and fluidfoil support tubes 46 of FIG. 6, are strongly resilient. When they are made of thin spring steel, resilient phosphor bronze, or spring-steel mesh impregnated and coated with strongly resilient rubber, the air, other gas or strongly resilient foamed rubber that is in them may be at atmospheric pressure; but such low pressure is not preferred. Instead, they preferably are filled with gaseous material (air, nonaerial gas or gas-cell-containing plastic) that is well above atmospheric pressure; and preferably they are of thin, highly-ductile and fracture-resistant metal (for example copper) or of textile or metallic fabric that is impregnated and coated with strongly resilient rubber and inflated with helium, nitrogen, air, or hydrogen mixed with combustion-inhibiting gas, under a strong pressure, for example in the range of 20 to 40 pounds per square inch. When of sheet metal they are permanently inflated and sealed; when of fabric and plastic they are either filled with strongly resilient foamed rubber or inflated and repeatedly inflatable through rubber-tire-type inflation valves 20.

Preferably each of the tubes is separately inflated; and it is joined at each of its ends to other tubes of its cabin-encompassing, rib-strengthening set of tubes with discs (that are angled to its axis) and bonding material that are similar to junctions 22 of FIG. 5. Or the ends of the tubes may be flattened and bonded, and the flattened ends then joined.

The streamlined, outer-shape-forming, fabric-and-plastic envelope (74 in FIG. 1; 76 in FIG. 3; 78 in FIG. 4) in preferably stretched tautly over the tubes (which are glued together with flexible rubber cement or epoxy). Then through a small sealable opening the foam-plastic liquids are inserted. These liquids form the strongly resilient foamed-plastic filler 80 that is between the tubes and each envelope. Together with the bonded-together tubes this filler is sufficiently strong to hold the envelope in its normal position against minor shocks of turbulence, but in major shocks of storm or collision the resilient fluidfoils and supports will bend, and then return to their former shapes without damage.

Optionally, the fluidfoil and fluidfoil-support tubes may be formed of extruded metal or dense plastic, curved in a die; or straight extrusions may be end sealed, inflated and then bent to the desired curves. Also optionally, endless fluidfoil-and-support ribs of gas or plastic-filled cans 52 may be mold formed as generally indicated in FIG. 7. In this event, the fabric or mesh 54 is flexible and preferably resilient, and the material 56 comprises strongly resilient foamed plastic, which preferably is within and glued to a fluidfoil or support skin.

Preferably resilient fairings 82, 84 and 86, comprising flexible fairing skins and strongly resilient foamed plastic, are bonded to the exterior sidewall surfaces of the cabin, to reduce the drag of the fluidfoil supports and form a thick sidewall bumper. The resilient, rubber-hose-like bumper tubes 88, strongly inflated with gaseous material of the above-described type, extends the bumper-safety structure on around the cabin, except that this structure optionally may be eliminated at the windowed opening 90. These fairings and bumper tubes aid in fastening the fluidfoil-support tubes to the cabin wall; and also bonding material of a known type securely fastens the support tubes to the cabin wall at the curved joint.

Other openings in the cabin walls may be provided, for example the frame-surrounded hatches 92. The plexiglass or shatter-resistant-glass windows in 90 are fastened within rib 92' and certain ribs are interrupted and end-bonded to frames around all windowed openings in the top and sidewalls.

Optionally and preferably, balloon means 94 are utilized to exert additional lift on the cabin and to aid in stabilizing the craft against rolling and pitching motions. This balloon means, containing lighter-than-air gas, comprises a row or set of balloon bags, of balloon fabric or thin, dense plastic or very thin, lightweight metal, which preferably are in a fore-and-aft series with their axes in upright positions. The top of one of these bags is formed to snugly fit beneath the contour of each of the upper fluidfoils (or other upper balloon-supporting elements), and is strongly glued to that element. The bottoms of all the bags preferably are contoured to fit and are glued to the top cabin wall.

The attitude and steering of the craft may be controlled by any known type of attitude-control and steering means. For example, these means may comprise common airplane-tail control means, such as are shown in FIG. 1 at the after end of the balloon, supported on the top of the cabin by the strongly inflated thin-metal pipe 96. This pipe is fastened to the after portion of the balloon; and this portion is braced by the strongly inflated, thin-walled tube 98, optionally resilient, glued to the top of the fluidfoil 100.

Any type of jet or mechanical propulsion of the craft may be utilized. In FIG. 1 mechanical propellers 102 are shown as driven by motors 104, which may be internal combustion engines or fluid motors powered with fluid via flexible tubing from an engine on the top or the interior of the cabin.

Within the scope of the following claims, various changes in the disclosed structure may be made. For example, wheels or skids may be attached to the lower fluidfoils, to provide for amphibious use of the vehicle.

In the claims, unless otherwise qualified, the work "tube" signifies a hollow receptacle of any cross-sectional shape, endless or having spaced ends; the term "tubular member" means a single tube of the type specified just above or a straight, curved or annular series of connected tubes of the said type; "plastic" signifies natural or synthetic rubber or any other plastic; and "gas" means any pure gas or mixture of gases.

I claim:

1. A vehicle, adapted to transverse water, comprising:

a cabin, having: a longitudinal, fore-and-aft axis; top and bottom walls; and sidewalls, having vertically curved outer surfaces which form in intersection with cross-sectional planes normal to said axis vertical, arcuate, outwardly convex curves;

strongly resilient fluidfoil means, below and spaced from the bottom of the said cabin, functioning as a hydrofoil when traveling in water, comprising at least one fluidfoil, with spaced ends that are below spaced side portions of the cabin, having: a plurality of fore-and-aft-arranged fluidfoil tubes that are annular in cross section and have different diameters, with at least one tube of a smaller diameter being positioned aft of a tube of larger diameter; gaseous material in the interiors of said tubes; foamed plastic, surrounding the tubes; and a waterproof, fluid-dynamically shaped fluidfoil skin, tautly positioned around said foamed plastic and tubes; and resilient fluidfoil-support means, comprising support structures on the sides of the cabin; each of said structures having an upper end located generally above one of said fluidfoil ends, and comprising: support tubes, each of which has substantially the same diameter as a matching tube of the fluidfoil tubes and is fixed to said matching tube; gaseous material in the interiors of said support tubes; foamed plastic surrounding the support tubes; and a waterproof support skin, shaped to reduce drag from the relative flow of fluid in travel, tautly positioned around said last-named foamed plastic and tubes; and in which each of the said structures has a portion that is closely adjacent to and is curved to fit against one of said vertically curved outer sidewall surfaces, and comprises means securely and strongly fastening said adjacent portion to said one of the vertically curved surfaces.

2. A vehicle as set forth in claim 1, in which the said gaseous material is gas under a pressure well above that of the atmosphere.

3. A vehicle as set forth in claim 2, in which the material of said tubes comprises fabric and resilient plastic.

4. A vehicle as set forth in claim 1, in which the said gaseous material is lighter-than-air gas.

5. A vehicle as set forth in claim 1, in which said vehicle is a boat, and said fluidfoil means below the cabin is a hydrofoil, adapted to lift the cabin above the surface of nonturbulent water in forward, speedy travel of the boat.

6. A vehicle as set forth in claim 1, in which the upper ends of said structure are located above said cabin, and in which the said vehicle further comprises support-bracing means, having spaced ends that are fixed to said upper ends, bridging over a space above the cabin, and having: support-bracing tubes, each of which has substantially the same diameter as an adjacent tube of the said fluidfoil-support tubes and is fixed to said adjacent tube; gaseous material in the interiors of said support-bracing tubes; foamed plastic, surrounding said support-bracing tubes; and a waterproof envelope, shaped to reduce drag from the relative flow of fluid in travel, tautly positioned around said last-named foamed plastic and tubes.

7. A vehicle as set forth in claim 6, in which said support-bracing means has fluid-dynamically shaped outer surfaces and exerts lifting force on the cabin.

8. A vehicle as set forth in claim 6, further comprising: in the space between said cabin and support-bracing means, lighter-than-air balloon means for exerting a lift on said cabin and aiding in stabilizing the vehicle against rolling and pitching motions; and means connecting said balloon means to said cabin and to said support-bracing means.

9. A vehicle as set forth in claim 1, in which said tubes are of thin, resilient metal.

10. A vehicle as set forth in claim 1, in which said cabin has barrel-curved outer surfaces and comprises fore-and-aft-arranged, curved, endless ribs and means strongly fastening said ribs together, said ribs comprising: endless tubular members; and integral, strength-providing insulating material around and adding strength to each of said tubular members.

11. A vehicular cabin, having curved outer surfaces, and comprising fore-and-aft-arranged, curved, endless ribs and means strongly fastening said ribs together, said ribs comprising: endless tubular members; and integral, strong, insulating material surrounding and adding strength to each of said tubular members wherein said cabin has substantially rigid walls having barrel-curved surfaces, and in which said device further comprises; vehicular fluidfoil means, below and spaced from said cabin, having fluid-dynamic surfaces for exerting lifting force on said cabin; and fluidfoil supporting means strongly connecting said fluidfoil means to said cabin.

12. A device as set forth in claim 11, in which said fluidfoil means and fluidfoil-supporting means are stiffly resilient.

13. A device as set forth in claim 11, in which said fluidfoil means comprises a looped lift-producing means that encompasses said cabin and comprises resilient upper fluidfoil means, spaced above said cabin; resilient lower fluidfoil means, spaced below said cabin, providing a hydrodynamic lift when traveling in water; and resilient connecting means, joining and supporting said upper and lower fluidfoils.

14. A device as set forth in claim 11, in which said fluidfoil means comprises tubular members, pressurized gaseous material in said tubular members, and resilient plastic surrounding the tubular members.

15. A vehicle comprising:

a cabin having substantially rigid walls and barrel-curved outer surfaces, comprising: curved ribs; means strongly fastening said ribs together; and integral insulating material surrounding and adding strength to said ribs; and looped lift-producing means that encompasses said cabin and comprises: resilient upper support means, extending above and across said cabin; resilient lower fluidfoil means, spaced below said cabin, providing a hydrodynamic lift when traveling in water; and resilient connecting means, joining and supporting said upper and lower means, and fitted against portions of said surfaces.